United States Patent [19]

Lubarsky

[11] Patent Number: 4,601,045
[45] Date of Patent: Jul. 15, 1986

[54] MODULATOR-DEMODULATOR METHOD AND APPARATUS WITH EFFICIENT BANDWIDTH UTILIZATION

[75] Inventor: Daniel P. Lubarsky, San Jose, Calif.
[73] Assignee: Larse Corporation, Santa Clara, Calif.
[21] Appl. No.: 637,362
[22] Filed: Aug. 3, 1984
[51] Int. Cl.$^4$ ............................................. H04B 15/00
[52] U.S. Cl. ........................................ 375/38; 375/48; 375/53; 375/58; 371/30; 370/69.1; 370/70
[58] Field of Search .................... 375/38, 44, 45, 48, 375/51, 53, 57, 58; 370/69.1, 70; 371/2, 30, 49; 364/726

[56] References Cited
U.S. PATENT DOCUMENTS

| | | | |
|---|---|---|---|
| 3,430,143 | 2/1969 | Walker et al. | 375/53 |
| 3,485,949 | 12/1969 | Haas | 375/56 |
| 4,011,511 | 3/1977 | Chang | 375/48 |
| 4,425,666 | 1/1984 | Groth, Jr. | 375/48 |
| 4,509,051 | 4/1985 | Lewis | 364/726 |

*Primary Examiner*—Benedict V. Safourek
*Attorney, Agent, or Firm*—Townsend and Townsend

[57] ABSTRACT

A method and apparatus for modulating and demodulating information for bandlimited communication is disclosed. Serialized digital data is divided into equal segments which are arranged in parallel. Each data segment is converted into a digital representation of a modulating value (either frequency, phase, amplitude or some combination). Each such digital representation is then combined in a particular manner with a number of digital representations of different carrier frequencies. This overlapping, whereby each digital representation of a carrier frequency is combined with several digital words in such a way that the corresponding analog carrier frequency would be modulated, and each digital word so "modulates" several carrier frequency representations, is called shoring. The resulting digital signals are processed to construct a digital representation of an analog signal which is the superposition, or amplitude sum over time, of all the different modulated carrier frequencies. The digital representation is then converted into an analog signal for transmission.

36 Claims, 7 Drawing Figures

MODULATOR-DEMODULATOR METHOD AND APPARATUS WITH EFFICIENT BANDWIDTH UTILIZATION

BACKGROUND OF THE INVENTION

This invention relates to bandlimited telephone line data communication and in particular to digital data transmission and reception employing phase, amplitude and frequency modulation techniques in connection with frequency domain multiplexing.

Digital data is generally communicated at bit rates in the range from 300 bits/sec. to about 9600 bits/sec. over the public voice telephone switched network in either full duplex or half duplex operation. The effective bandwidth of a standard voice grade telephone line is from about 300 Hz to 3500 Hz with most energy concentrated between about 500 Hz and 2800 Hz. Typical modulator-demodulators (modems) operating on telephone lines, which are designed to provide 1200 bits/sec. full duplex communication across a single two-wire telephone line, divide the available bandwidth in half. The lower portion of the band (from about 300 Hz to 1900 Hz) may be used by the originating modem to transmit a single channel, while the higher frequency portion of the band (between about 1900 Hz and 3500 Hz) may be used for transmission of a single channel by the answering modem. Modems that employ this technique generally have a single carrier signal centered in each band portion which is modulated with frequency deviations within the available bandwidth.

Various modulation techniques are known for encoding digital information on a basically analog carrier system. One of the more popular is called quadrature amplitude modulation, which encodes information in the form of a combination of amplitude and phase relative to a reference signal. Other modulation techniques are known, such as differential phase shift keying (DPSK), frequency shift keying (FSK) and polybinary amplitude modulation.

In order to increase the rate at which data is transmitted, some modems use several different carrier frequencies within the available bandwidth, with each carrier frequency separately modulated. The several carrier frequencies are combined and transmitted simultaneously in a group. Such groups (called baud intervals) are transmitted serially to produce a data stream. One such modulator is shown in Stenstrom et al., U.S. Pat. No. 4,100,369. A demodulator for such a modulation method is shown in Daguet et al., U.S. Pat. No. 3,891,803. These systems have the disadvantage of being susceptible to intersymbol interference between such groups due to the abrupt change at the edge of the baud intervals and also due to the large changes in the nature of the signals within each baud interval. In addition, group delays due to transmission line delays affect different frequencies by different amounts, with the largest effects at baud edges.

The known method for reducing such intersymbol interference is to provide spacing between baud intervals. The demodulator ignores the signals in the space between baud intervals and thus transients in such spaces have no effect. This method is shown in Hick, *Digital Super Modem: Why and How It Was Developed,* DATA COMMUNICATIONS 87 (June 1980) and in Keasler et al., U.S. Pat. No. 4,206,320. This method, however, is not effective for full duplex operation over a two wire line because the transients in the transition spacing between baud intervals in one direction will interfere with the baud intervals in the other direction. In addition, the use of transition spacing limits the amount of data that can be transmitted on the available bandwidth.

SUMMARY OF THE INVENTION

The invention is a method and apparatus for modulating and demodulating information for bandlimited communication. Serialized digital data is divided into equal segments which are arranged in parallel. Each data segment is converted into a digital representation of a modulating value (either frequency, phase, amplitude or some combination). Each such digital representation is then combined with a number of digital representations of different carrier frequencies by a process called "shoring." The term "shoring," as used herein, is the combination of each one of a plurality of digital representations of carrier frequencies with several digital words such that each corresponding analog carrier frequency would be modulated by each of the digital words, and each digital word is so applied to a plurality of carrier frequency representations. The resulting digital signals are processed to construct a digital representation of an analog signal which is the superposition, or amplitude sum over time, of all the different modulated carrier frequencies. The digital representation is then converted into an analog signal for transmission.

In the preferred embodiment, shoring is done by multiplying a vector group of digital words representing phase and amplitude modulating values by a shoring matrix which is an identity matrix modified so that one of the diagonals immediately adjacent the identity diagonal is composed of values of negative one. The values resulting from the shoring are each combined with a digital representation of a different carrier frequency so that the corresponding analog carrier frequency would be modulated. The resulting digital signals are processed to construct a digital representation of an analog signal which is the superposition of all the different modulated carrier frequencies. The digital representation is then converted into an analog signal for transmission.

The preferred shoring technique according to the invention combines the digital representations to cause the signal to approach a zero value at each transition between baud intervals, thus minimizing interference between baud intervals by eliminating abrupt changes. The preferred shoring technique also combines the digital representations in a manner which reduces large changes in the nature of the signals within each baud interval. A digital data processing technique for shoring is described in detail hereinafter. A benefit of the shoring technique is that the effect of group delay is reduced because most of the signal is concentrated in the center of the baud interval, since the baud interval boundaries are the portion of the baud interval most susceptible to group delay. In addition, because dead band spacing between baud intervals is not required, a minimum of the available bandwidth is wasted as transitions between baud intervals.

The preferred shoring technique reduces the effect of noise on the signal. Any noise affecting a particular carrier frequency affects several digital words instead of just one so that the effect is diluted. The effect of noise on each word or bit group is also attenuated, since frequency-dependent noise affecting a digital word on one carrier frequency generally would not affect that same word which is also present on another carrier frequency. Thus the lower frequencies in the phone channel, which are more susceptible to noise than the higher frequencies, can be used more effectively with the present invention.

The signal is demodulated by sampling the received signal only within a time window which is digitally synchronized to each baud interval, and then by inversely processing the stream of samples (by demodulating and inverse shoring) to reconstruct the modulation values which are then converted to the original data segments.

In a specific embodiment, the modulator portion of a modulator-demodulator (modem) accepts data in the form of a high-speed serial stream of binary impulses from a digital data source. Precoding techniques may be employed to merge digital data from several sources into the serial bit stream. The bit stream is divided into segments of twelve groups or words of five bits each, to which is added a synchronization word and an error correction word for a total of fourteen words. Each 5-bit word is valued as one of sixteen discrete phase states and one of two magnitudes. Shoring according to the invention is effected upon such 5-bit words. A baud interval or frame of 12.5 milliseconds is used. A single channel thus transmits at a rate of 80 baud (80 symbols, or baud intervals, per second) of 12 data words of five bits each or 4800 bits/sec. In a full duplex system, the telephone line bandwidth is divided into two bands of sixteen channels each of which is distributed at an equal frequency interval over the selected band.

The process of demodulation (i.e., detecting the data) involves synchronously sampling the received analog signal so that each segment is analyzed within a time window. The sampling rate of the receiver is selected to be more than twice the Nyquist limit for the communication frequencies employed in the modem.

Fast Fourier Transform (FFT) processing techniques are employed in both modulation and demodulation. The initial coarse synchronization of the receiver to the received signal is achieved by means of a narrowband digital filter which tracks and identifies nulls between baud intervals in the received signal. A fine adjustment to compensate for line delays is accomplished by means for calculating the relative phase shifts between different carrier frequencies.

Error correction is done by transmitting a 5-bit error correction code word which represents the least significant bit of each of 12 data words in a phase and amplitude format. Noise affecting the signal will have the greatest effect on the least significant bit, which represents the smallest incremental change in phase and amplitude. Correction is accomplished by varying each least significant bit until a match with the code word is obtained.

The invention will be better understood by reference to the following detailed description taken in connection with the accompanying drawings.

BRIEF DESCRIPTION OF THE DRAWINGS

FIG. 3 is a specific embodiment of a modem according to the invention.

FIGS. 3, and 3A, 3B together are a block diagram of a specific modem according to the invention.

DETAILED DESCRIPTION OF SPECIFIC EMBODIMENTS

Figure 1:
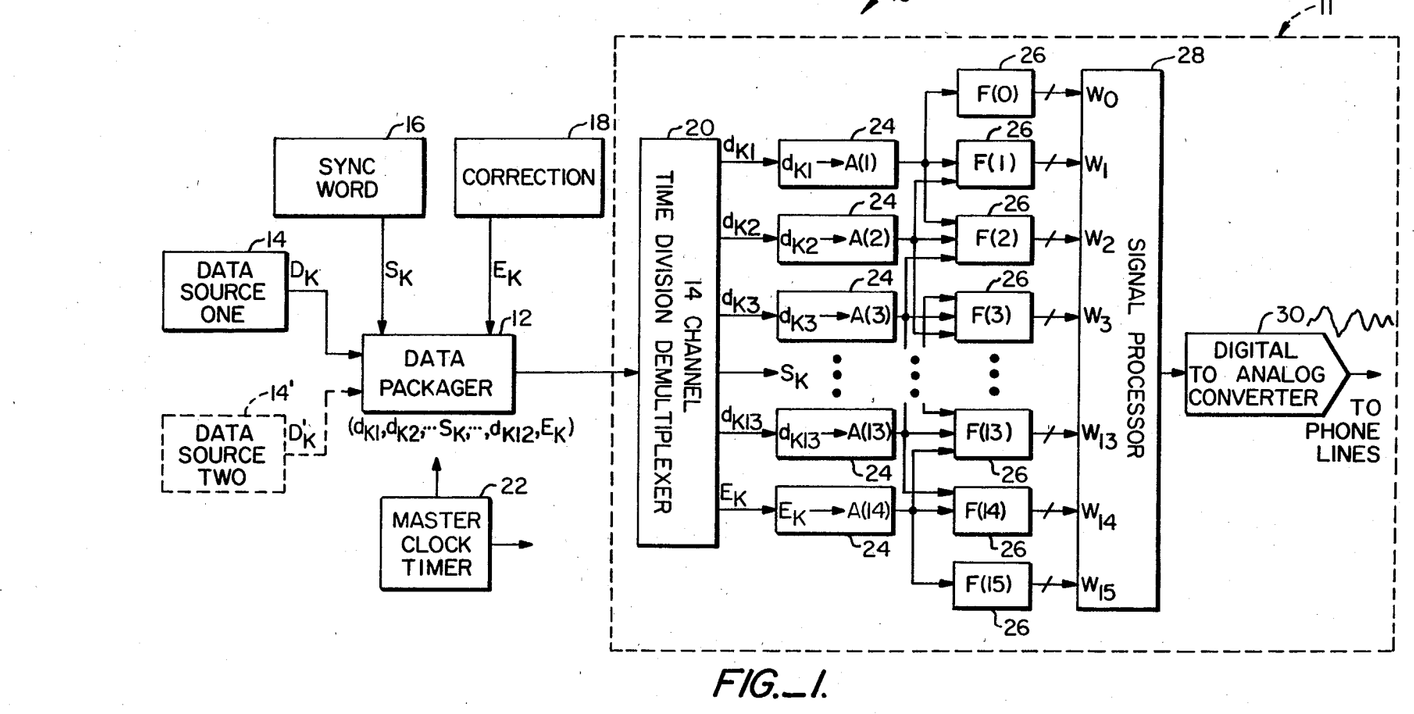
FIG. 1 is a functional block diagram of a transmitter according to the invention.

Turning to FIG. 1, there is shown a block diagram of a transmitter portion 10 with a modulator portion 11 of a modem system for use in communicating a signal over a bandlimited transmission path. A premodulator portion comprises a data packager 12 which is operative to divide serialized bits of digital information from one or more data sources 14 and 14' into segments of equal length, the data packager 12 being further operative to insert a synchronization word ($S_K$) from a sync word generator 16 in the middle of each segment and an error correction code word ($E_K$) from an error correction code generator 18 at the end of each segment to produce a signal to a demultiplexer 20. The modem system, being digital, operates under control of a master clock-/timer 22.

In a specific embodiment of the invention, the data packager 12 groups data in serial data stream segments of twelve 5-bit words with a 5-bit sync word $S_K$ and a 5-bit error correction code word $E_K$ to produce a segment of fourteen words. While any segmentation and word grouping may be employed according to the principles of the invention, this grouping is intended to approach an optimum for a standard data rate of 4800 bits per second full duplex transmission through standard voice grade switched telephone channels.

Each one of the 5-bit words in a segment is directed to a converter 24 where four bits of the 5-bit pattern are transformed into $\pi$ format. The $\pi$ format number represents a phase angle. The $\pi$ format is the two's complement representation of the 4-bit word divided evenly over the full range of $2\pi$ phase states. Four bits can represent sixteen states, which is equivalent to 22.5 degrees of phase per state. The fifth bit represents an amplitude value.

Each transformed word is employed as the modulating signal for two carrier frequencies in shoring function generators 26 in accordance with a shoring procedure described below. Thus a word will modulate a carrier frequency and either the next higher or lower carrier frequency, depending on the direction of the shoring. For example, word A(1) modulates frequencies in F(1) and F(0) for left-shoring and frequencies in F(1) and F(2) for right-shoring.

Each shoring function generator uses a different carrier frequency within the band being used. The effective bandwidth of a standard voice grade phone channel is from 300 Hz to 3500 Hz, which is divided into a high and low band for full duplex transmission. The sixteen carrier frequencies used by the shoring function generators 26 would be evenly spaced from 400 Hz to 1600 Hz for the low band and from 1680 Hz to 2880 Hz for the high band.

The shoring function generators each produce a complex number representative of a modulated carrier frequency as an input to a signal processor 28. Signal processor 28 is a discrete inverse Fourier transform processor which combines the complex number inputs to provide a digital representation of a single real frequency signal. The digital signal is converted to an analog signal for transmission by digital to analog converter 30.

Shoring Modulation

The shoring operation shown in FIG. 1 is performed in accordance with Equation 1 below where W is a constant shoring matrix, AV is a vector group of the digital signals from the converters and FV is a vector group of the output digital signals of the shoring function generators.

$$W * AV = FV \quad \text{Equation 1}$$

or $$\begin{bmatrix} W(0,0) & \ldots & W(0,P) \\ \cdot & & \cdot \\ \cdot & & \cdot \\ W(P,0) & \ldots & W(P,P) \end{bmatrix} * \begin{bmatrix} A(0) \\ \cdot \\ \cdot \\ A(P) \end{bmatrix} = \begin{bmatrix} F(0) \\ \cdot \\ \cdot \\ F(P) \end{bmatrix}$$

P is equal to the number of signals to be shored plus one. Thus, where 14 data words are used as described in FIG. 1, P=15. The points A(0) and A(P) are reference points added to the matrix of data words and are always equal to zero.

The value for each output value of vector FV is determined by matrix multiplication as set forth in Equation 2.

$$F(x) = \sum_{k=0}^{P} W(x,k) * A(k) \quad \text{Equation 2}$$

The preferred matrix for the constant shoring matrix W for the low band transmissions is a left-shoring matrix which has every value equal to zero except for the W(0,0) to W(P,P) diagonal, which is all ones, and the W(0,1) to W(P-1,P) diagonal, which is all negative ones, is shown in Equation 3 for 14 data words.

$$W_L * AV = FV \quad \text{Equation 3}$$

or $$\begin{bmatrix} 1 & -1 & 0 & 0 & \ldots & & & 0 \\ 0 & 1 & -1 & 0 & & & & 0 \\ 0 & 0 & 1 & -1 & & & & 0 \\ \cdot & & & & \cdot & & & \\ & & & & 1 & -1 & 0 & \\ & & & & 0 & 1 & -1 & \\ 0 & 0 & 0 & 0 & \ldots & & \cdot & 1 \end{bmatrix} * \begin{bmatrix} A(0) \\ \cdot \\ \cdot \\ \cdot \\ A(15) \end{bmatrix} = \begin{bmatrix} F(0) \\ \cdot \\ \cdot \\ \cdot \\ F(15) \end{bmatrix}$$

Table 1 below shows the calculation of each output, F(x), and the corresponding carrier frequency.

TABLE 1

| Frequency (Hz) | F(x) |
| --- | --- |
| 400 | F(0) = 0−A(1) |
| 480 | F(1) = A(1)−A(2) |
| 560 | F(2) = A(2)−A(3) |
| 640 | F(3) = A(3)−A(4) |
| 720 | F(4) = A(4)−A(5) |
| 800 | F(5) = A(5)−A(6) |
| 880 | F(6) = A(6)−A(7) |
| 960 | F(7) = A(7)−A(8) |
| 1040 | F(8) = A(8)−A(9) |
| 1120 | F(9) = A(9)−A(10) |
| 1200 | F(10) = A(10)−A(11) |

TABLE 1-continued

| Frequency (Hz) | F(x) |
| --- | --- |
| 1280 | F(11) = F(11)−A(12) |
| 1360 | F(12) = A(12)−A(13) |
| 1440 | F(13) = A(13)−A(14) |
| 1520 | F(14) = A(14)−A(15) |
| 1600 | F(15) = 0 |

For high band transmissions, a right-shoring matrix is used which has every value equal to zero except for the W(0,0) to W(P,P) diagonal, which is all ones, and the W(1,0) to W(P,P-1) diagonal, which is all negative ones. This matrix is shown below for 14 data words:

$$\text{Equation 4}$$

$$W = \begin{bmatrix} 1 & 0 & 0 & 0 & \cdot & \cdot & \cdot & 0 \\ -1 & 1 & 0 & 0 & & & & \cdot \\ 0 & -1 & 1 & 0 & & & & \cdot \\ \cdot & & & & & & & \cdot \\ \cdot & & & & & & & \cdot \\ & & & & 0 & -1 & 1 & 0 & 0 \\ & & & & & 0 & -1 & 1 & 0 \\ 0 & \cdot & \cdot & \cdot & & & 0 & -1 & 1 \end{bmatrix}$$

Table 2 below shows the calculation of each output, F(x), and the corresponding carrier frequency.

TABLE 2

| Frequency (Hz) | F(x) |
| --- | --- |
| 1680 | F(0) = 0 |
| 1760 | F(1) = A(1)−A(0) |
| 1840 | F(2) = A(2)−A(1) |
| 1920 | F(3) = A(3)−A(2) |
| 2000 | F(4) = A(4)−A(3) |
| 2080 | F(5) = A(5)−A(4) |
| 2160 | F(6) = A(6)−A(5) |
| 2240 | F(7) = A(7)−A(6) |
| 2320 | F(8) = A(8)−A(7) |
| 2400 | F(9) = A(9)−A(8) |
| 2480 | F(10) = A(10)−A(9) |
| 2560 | F(11) = A(11)−A(10) |
| 2640 | F(12) = A(12)−A(11) |
| 2720 | F(13) = A(13)−A(12) |
| 2800 | F(14) = A(14)−A(13) |
| 2880 | F(15) = 0−A(14) |

A simple example of the shoring technique can be shown where there is only one data word in the low band. The matrix equation is set forth below.

$$W * AV = FV \quad \text{Equation 5}$$

or $$\begin{bmatrix} 1 & -1 & 0 \\ 0 & 1 & -1 \\ 0 & 0 & 1 \end{bmatrix} * \begin{bmatrix} A(0) \\ A(1) \\ A(2) \end{bmatrix} = \begin{bmatrix} F(1) \\ F(2) \\ F(3) \end{bmatrix}$$

A(0) and A(2) are the reference points, and are thus equal to zero. Solving for each value of FV, we get the following:

$$F(0) = 1 * A(0) + (-1) * A(1) + 0 * A(2) = -A(1)$$

$$F(2) = 0 * A(0) + 1 * A(1) + (-1) * A(2) = A(1)$$

$$F(3) = 0 * A(0) + 0 * A(1) + 1 * A(2) = 0$$

Figure 4:
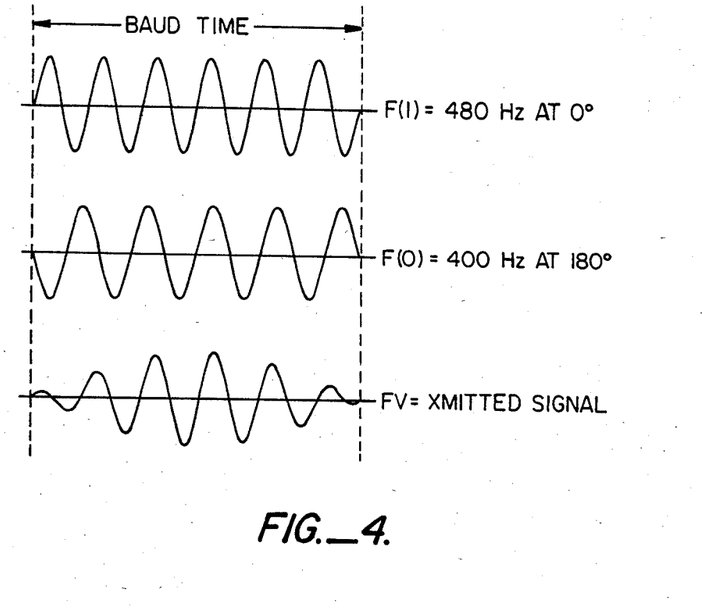
FIG. 4 is a diagram illustrating a simple case of shoring modulation according to the invention.

FIG. 4 shows a representation of the individual modulated signals F(1) and F(2) when the frequency of F(0)=400 Hz, F(1)=480 Hz, F(3)=560 Hz, the baud time interval=12.5 milliseconds and data word A(1) has an amplitude of one and a phase value of 0°. F(2) is not shown because its value is zero. F(0) shows a phase shift of 180° corresponding to F(0)=−A(1). The output signal, as it would be seen after all values of FV were combined in the signal processor 28 and processed through the digital to analog converter 30, is shown as FV.

Figure 5:
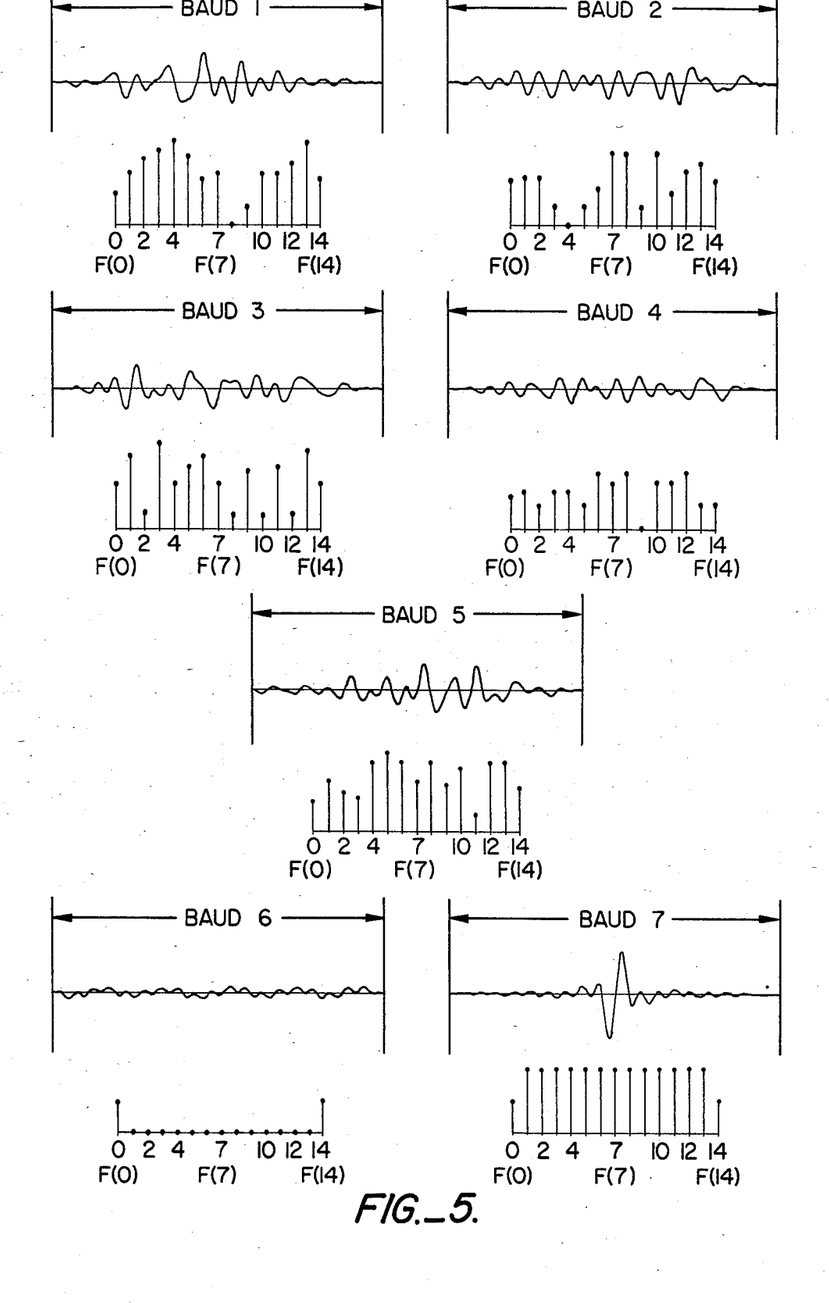
FIG. 5 is a diagram showing the baud interval waveforms produced by different inputs.

FIG. 5 shows some typical waveforms obtained in the actual transmission of data. Baud interval 1 through baud interval 5 represent typical random data transmissions, while baud intervals 6 and 7 show specific features of the modulation technique. It can be seen that there are smooth, coherent transitions between the baud intervals because the preferred shoring modulation technique forces the amplitude at the baud beginning and baud end times to be zero and to slowly increase towards the center of the baud interval. FIG. 5 also shows the spectrum of each baud interval directly below the time domain waveforms with the relative amplitude of each frequency shown. The frequencies were also randomly phase modulated. In baud interval 6 only 2 frequencies in the spectrum are transmitted, 400 Hz and 1520 Hz. All other frequencies are absent from the spectrum. Baud interval 6 is a case where all of the points within the vector AV have the same magnitude and phase. Baud interval 7 is the result when the points within the AV vector are separated by 180 degrees. The even points in AV are at 0 degrees and the odd points in AV are at 180 degrees. The magnitudes are identical.

Demodulation (Inverse Shoring)

For the demodulation, or inverse shoring, we need to solve for vector AV in equation 1. By using a sync word with an amplitude of 1 at 0 degrees, we can make A(7) equal to zero. A(0) and A(15) are the reference points, and are also zero. Thus, the columns W(0,0)−W(15,0), W(0,7)−W(15,7) and W(0,15)−W(15,15) all multiply zero values and therefore have no effect and can be dropped, creating the following equation:

$$B * YV = FV \qquad \text{Equation 6}$$

or $$\begin{bmatrix} W(0,1) & \ldots & W(0,6) & W(0,8) & \ldots & W(0,14) \\ \vdots & & & & & \vdots \\ \vdots & & & & & \vdots \\ \vdots & & & & & \vdots \\ W(15,1) & \ldots & W(15,6) & W(15,8) & \ldots & W(15,14) \end{bmatrix} \begin{bmatrix} A(1) \\ \vdots \\ A(6) \\ A(8) \\ \vdots \\ A(14) \end{bmatrix} = \begin{bmatrix} F(0) \\ \vdots \\ \vdots \\ \vdots \\ F(15) \end{bmatrix}$$

where YV is a vector group of only the data words and B is the W matrix with 3 columns dropped. B is not a square matrix, so we must multiply it by its transpose before multiplying by its inverse to solve for YV. Multiplying both sides of the equation by the transpose of matrix B yields the following:

$$B^T(B*YV) = B^T*FV \qquad \text{Equation 7}$$

Rearranging yields the following:

$$(B^T*B)YV = B^T*FV \qquad \text{Equation 8}$$

Solving for the YV vector yields:

$$YV = (B^T*B)^{-1}*B^T*FV \qquad \text{Equation 9}$$

where $(B^T*B)^{-1}B^T$ is a constant 13×16 matrix which we shall call D.

$$YV = D*FV \qquad \text{Equation 10}$$

We can solve for each point of vector YV as follows:

$$A(j) = \sum_{k=0}^{15} D(j-1,k) * F(k) \qquad \text{Equation 11}$$

for $j = 1, 2, \ldots 6, 8, \ldots 14$

Since the matrix D is a constant that is derived from the shoring matrix W, it is simply precomputed and stored for use by the demodulator.

Figure 2:
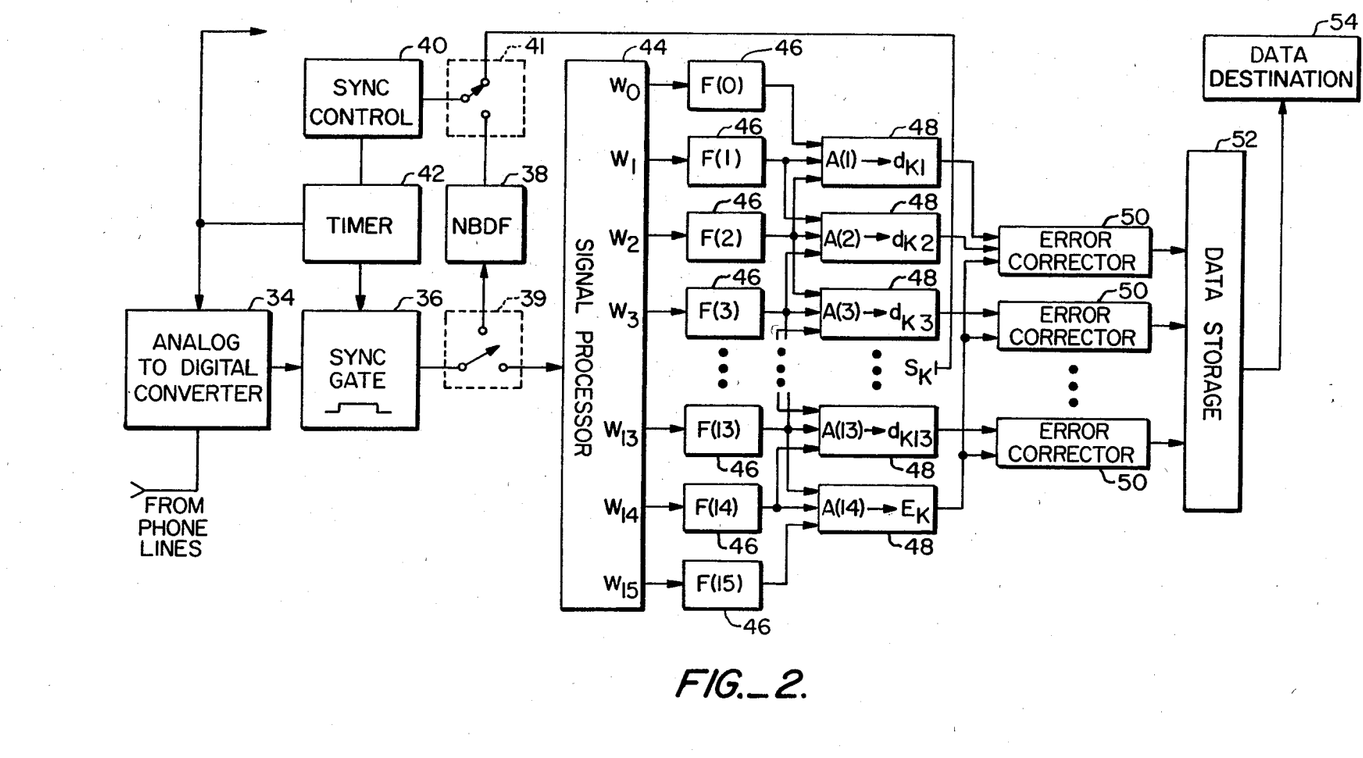
FIG. 2 is a functional block diagram of a receiver according to the invention.

Turning now to FIG. 2, there is shown a functional block diagram of a demodulator according to the invention which is capable of receiving an analog signal modulated by the modulator of FIG. 1. The analog signal into the modulator appears as a composite of 16 modulated frequencies spaced 80 Hz apart. The analog signal is applied to the input of an analog-to-digital converter 34 at the front end of the demodulator. Functionally the demodulator further comprises a synchronization gate 36, a narrowband digital filter 38 (NBDF), a synchronization controller 40 (sync control), a timer 42, a signal processor 44, fourteen inverse shoring function generators 46, fourteen phase and amplitude-to-data converters 48, twelve error correctors 50, and memory 52 for temporary data storage, the output of which is provided to a data destination 54 which may be a standard interface circuit such as a universal synchronous/asynchronous receiver/transmitter (USART).

The analog-to-digital converter 34 is coupled to the sync gate 36, the function of which is to provide a window to reconstruct data transmitted during each time frame of data. In a preferred embodiment, the analog-to-digital converter 34 samples the composite signal 128 times during a frame or baud signal. A signal may be processed as if the received signal is one cycle of a signal which is invariant over time. The signal processing occurs without reference to any prior signal history. The output of the sync gate 36, namely 128 samples per frame, is functionally directed during an initial synchronization cycle to the narrowband filter 38, as represented by a path through a switch 39, and in a feedback loop, as represented by a path through a switch 41 to the sync control 40. The sync control 40 controls the timer 42, which in turn controls the sync gate 36, the analog-to-digital converter 34 and all other functions requiring synchronization. The function of the narrowband digital filter 38 and sync control 40 will be explained hereinafter.

During data recovery, the sample values out of the sync gate 36 are directed to the signal processor 44, which extracts the sinusoidal components of the input signal by Fourier transformation of the input time domain signal. The outputs of the signal processor 44 are then applied to the inputs of sixteen inverse shoring function generators 46, the function of which is to extract the orthogonal sine, cosine and amplitude of each data word A(x) of vector AV. These function generators 46 perform the inverse function of the modulator's shoring function generators 26.

The outputs of the function generators 46, which are encoded as fourteen phase and amplitude values, are then applied to fourteen phase angle and amplitude-to-data converters 48. The data converters 48, which use a table look-up scheme, simply convert the detected phase value to four bits and the amplitude to one bit, giving a 5-bit data word.

The extracted 5-bit data word used for synchronization, $S_K$, is provided by means of a feedback line 51 through the switch 41 to the sync control 40 after the synchronization cycle. The sync word $S_K$ for each frame is used mainly to keep track of the master clock synchronization. The extracted error correction code $E_K$ from the converter 48 is provided to each error corrector 50 for use in comparison with the outputs of the twelve words of data. The extracted error correcting word $E_K$ is compared with a unique 5-bit error code representing the actual data words received. If the data does not match, an error correction scheme such as that described below is used. Assuming the data is matched, the output of the error corrector 50 is provided to data storage 52 and eventually to the data destination 54.

Embodiment Using Microprocessor-Based System

The system described in connection with FIGS. 1 and 2 represents one specific embodiment of the invention. The circuitry could be embodied in sequential and combinationatorial digital logic circuitry in a manner as shown in FIGS. 1 and 2. Alternatively, the invention may be embodied in a microprocessor-based system employing high-speed digital logic devices especially adapted for digital signal processing.

Figures 3, 3A:
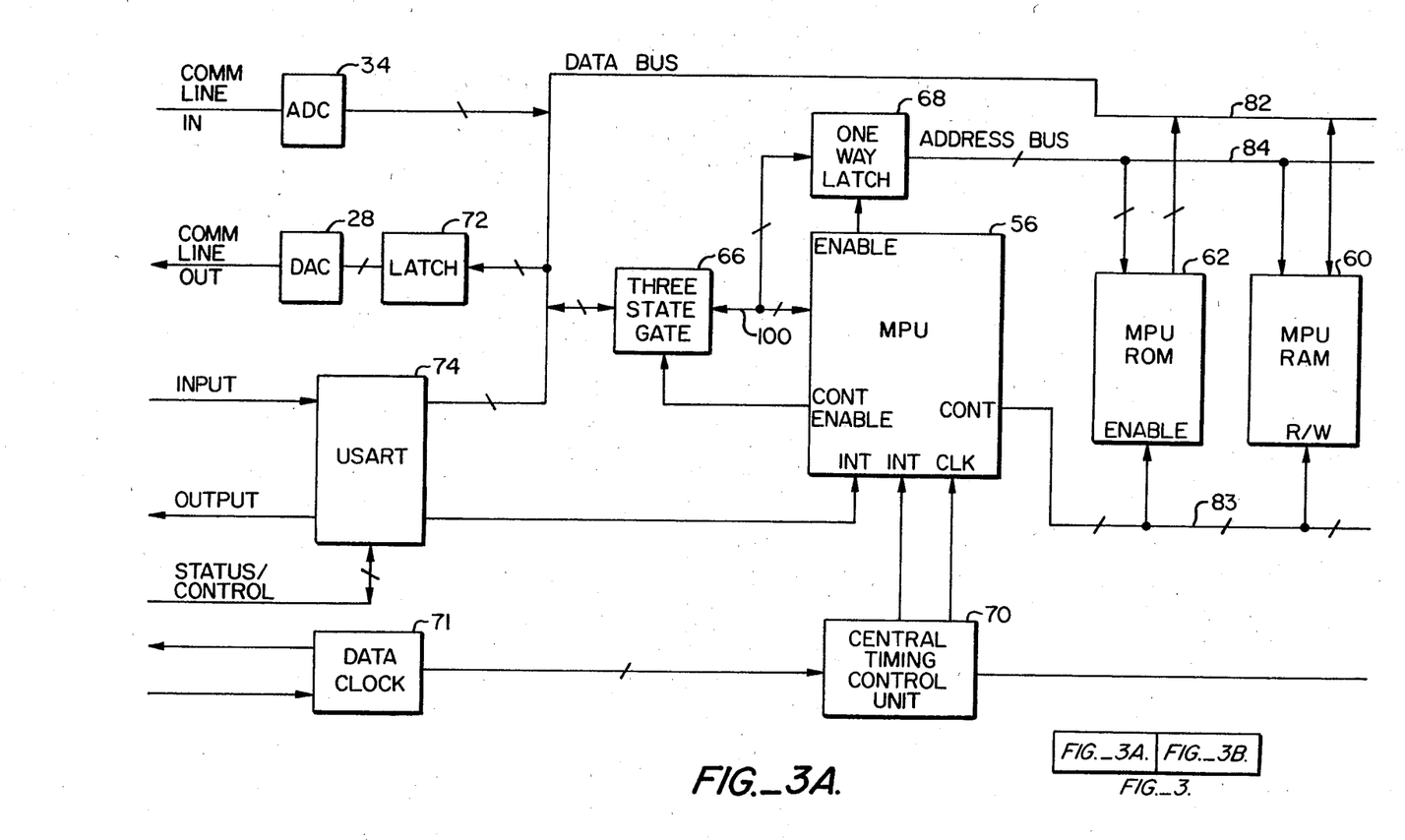
Figure 3B:
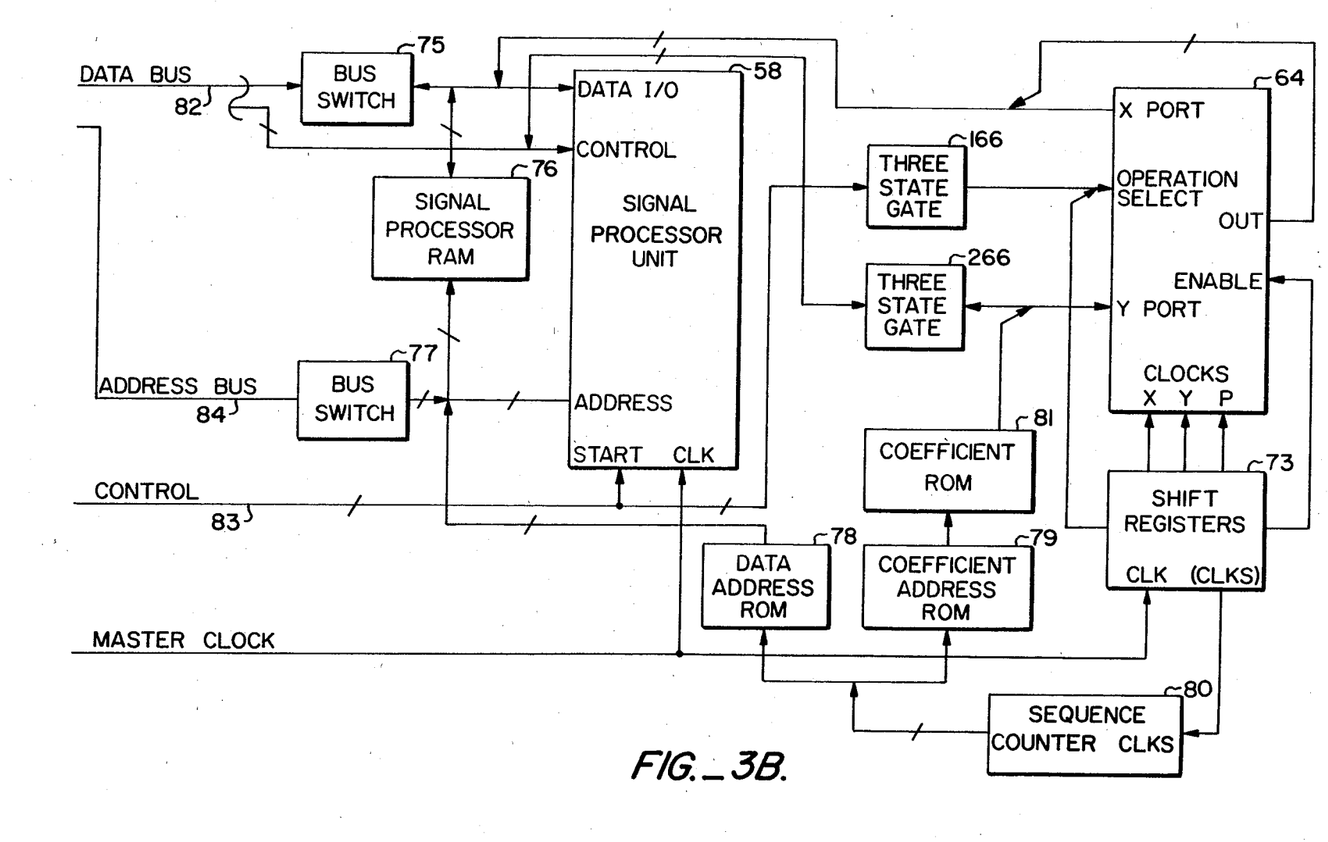

One such embodiment is illustrated in connection with FIGS. 3, 3A and 3B which show a block diagram of a modulator-demodulator according to the invention constructed of LSI components. Such a system includes a microprocessor unit (MPU) 56, a high-speed signal processor 58, volatile memory, such as random access memory, 60, program memory, such as read only memory (ROM), 62, a high-speed multiplier-accumulator 64, various three-state bidirectional gates 66, 166, 266 in the data bus 82 and the control bus 83 of the microprocessor 56, a one-way latch 68 in the address bus of the microprocessor 56, a central timing control unit 70 with associated I/O data clock 71 and shift registers operative as slave clocks 73, a USART 74, a data bus switch 75, a signal processor RAM 76, an address bus switch 77, a data address ROM 78, a coefficient address ROM 79, a sequence counter 80 and a coefficient ROM 81. The gate 66 and the latch 68 are employed to separate the MPU and address bus 100 data bus from the system data bus 82 and system address bus 84. Control functions of the MPU 56 are conveyed through control lines 83 to the MPU RAM 60, the MPU ROM 62, the signal processing unit 58 and via the gate 166 to the high-speed multiplier accumulator 64.

The microprocessor 56 performs the following operations:

1. It simultaneously samples an incoming signal through an analog-to-digital converter 34 and sends out a signal via a digital-to-analog converter 28.

2. It stores data received from a data source, namely USART 74.

3. It prepares data for transmission.

4. It processes signals received from phone lines through analog-to-digital converter 34 and transfers such data to the fast processor 58.

5. It provides frame acquisition and synchronization and tracking of synchronization.

1. RECEIVING AND TRANSMITTING

In a specific embodiment, the microprocessor 56 receives a nonmaskable interrupt signal from central timing unit 70 instructing it to perform the special task of transferring a digital word to a latch 72 forming temporary storage for the digital-to-analog converter 28. It then sends a signal to both the digital-to-analog converter 28 and the analog-to-digital converter 34 to trigger operation of both converters. The trigger signal causes the digital-to-analog converter 28 to generate an analog signal to be sent out on the phone line and further triggers the analog-to-digital converter to sample the incoming phone line analog signal. The microprocessor unit 56 then directs storage of the incoming sample to a calculated address in RAM 60.

2. STORING RECEIVED DATA

Data provided to the modem may either be synchronous or asynchronous data. A modem according to the invention may incorporate a universal synchronous-/asynchronous receiver/transmitter (USART) 74 to receive and send data from a data source or destination. If data is synchronous type, then a continuous stream is to be accepted and simultaneously sent through the USART 74. If the data is asynchronous type from a terminal, then it is not necessarily continuous, but rather is normally provided in packets of serial data provided with certain start and stop bits accompanying a 5- to 8-bit code representing one character. It is a function of the conventional USART 74 to receive and transmit synchronous or asynchronous data from and to a data source and destination, respectively. The data received from the data source is retrieved in response to a maskable interrupt to the microprocessor unit 56, causing the microprocessor unit 56 to execute a special code and store the incoming data in the MPU RAM 60.

3. PREPARING DATA FOR TRANSMISSION

To transmit data, the microprocessor unit 56 must provide a continuous stream of sixty bits of data whether or not it has received that amount of data to transmit. To do so, the microprocessor unit 56 retrieves data from the MPU RAM 60 received from the USART 74, breaks the data words irrespective of code into twelve data words, one error correction word $E_K$ and one sync word $S_K$ for a total of fourteen 5-bit words. $E_K$ is formed by taking the least significant bit of each data word and forming a 12-bit word. This 12-bit word is loaded into a code generator to obtain a 5-bit code error word $E_K$ which is unique to the 12 bit pattern. The 5 bit error word $E_K$ is then processed as if it were another word of data. The MPU then converts four bits of each data word into the corresponding $\pi$ format, computes the sine and cosine values of the phase angle values represented by four bits of each word, performs a shoring function to transform the sine, cosine and amplitude of words, A(x) of vector AV, into complex numbers, F(x) of vector FV, and then transfers the stored real and imaginary components of the complex numbers to the fast processor memory 76 via data bus 82. The sine and cosine values of the phase angle value represented by each word are computed by a look-up table. It is the function of the fast processor 58 to convert the real and imaginary values for each of the fourteen words into 128 digital words which represent the composite analog voltage signal of sixteen frequencies modulated by fourteen different words representing a phase and amplitude. The process is preferably an inverse Fourier transform of sixteen frequency domain signals. The fast processor 58 generates the 128 words in approximately 3.0 milliseconds. Since a frame of data is 12.5 milliseconds in duration, the microprocessor unit 56 and fast processor 58 are together capable of carrying out all needed functions for each frame well within the duration of a frame.

4. PROCESSING A RECEIVED SIGNAL

When the apparatus according to the invention is functioning in the signal receive mode, and assuming initial synchronization has already taken place, the central timing unit 70 is synchronized to the start of each 12.5 millisecond frame. The microprocessor unit 56 controls the storage and retrieval of 128 samples of the incoming analog signal. Once received, the samples are transferred to the processor RAM 76 and the fast processor 58 is enabled in synchronization with the beginning of each frame. Sampling of the incoming signal is preferably at or above the Nyquist rate for the highest frequency component of the received signal. Assuming proper synchronization, the fast processor 58 will convert the 128 received samples to the real and imaginary values of the FV vector transmitted in accordance with the invention and store those values in the processor RAM 76. The fast processor 58 preferably performs a direct Fast Fourier transform of the time domain data. The microprocessor unit 56 retrieves the real and imaginary values from RAM 76 and transforms them to the sine, cosine and amplitude values of vector AV. The retrieved phase angle values will be stored in the RAM 60 for later use in error correction processing, as needed. The conversion from AV to the fourteen 5-bit data words is preferably by a table look-up technique for the ratio of sine and cosine values. Corrected data, which is in the $\pi$ format, is then converted to the original format of 5-bit data words, twelve of which are for information and two of which are for synchronization and error correction.

The microprocessor unit 56 performs error correction in the following manner. Twelve bits are formed by taking the least significant bit from each of the twelve information words. The twelve bits are then grouped in a defined order and processed through a 5-bit error correction code processor. If the computed 5-bit error correction code matches the 5-bit error code transmitted in A(14), it is presumed with a high degree of confidence that the data received during that particular frame has been recovered without error.

In the absence of a match between the computed 5-bit error correction code and the 5-bit transmitted error code, each of the 12 bits and the 5 bits of the error code (17 bits) is changed in sequential order and then reprocessed by the error correction code generator until the resultant 5-bit error correction code matches the transmitted 5-bit error code. If a match is found, a flag signal is generated to notify of detection and correction of an error. If no match is found, the assumption is made that the error is not correctable and an uncorrected error flag is set. This error correction scheme is different from the normal error correction scheme, in which noise is assumed to affect all information bits equally, and therefore the code must be able to correct any one of the bits in error. In this modulation scheme, noise does not affect each bit equally. The 60 information bits are divided into 12 words of data, each containing 5 bits. Noise has the greatest effect on the least significant bit, and a lesser effect on the other bits within the 5 bit word. Each error that is detected separately affects only one of the 12 data words. The correction is based on the phase angle closest to the actual received phase angle. Since the received phase angle is wrong, the angle that it is closest to is most probably the correct one.

The twelve words of received data are then ready for transfer to the data destination. If all twelve words represent actual data, all of the data is sent serially through the USART 74. If, however, only a portion of the twelve words is data and the remainder is filler, the last data word prior to the error correction code will contain information indicating the number of words which are data words. The USART 74 then adds the required start and stop bits in a conventional manner and thereafter serially transmits the actual data.

5. FRAME ACQUISITION AND SYNCHRONIZATION

Frame acquisition is accomplished in 2 steps. First, a coarse adjustment is done and then a fine adjustment is done. The coarse adjustment is accomplished through the use of a narrow band digital filter which detects the null that occurs between frames. The null occurs whether or not data is being transmitted and is the result of the shoring technique. FIG. 4 illustrates this null at the edges of FV. The narrow band digital filter is used because of the possibility of group delay. If group delay is present then each pair of frequencies will have its null at a different place in time. Thus, the narrow band filter only gives the approximate location of the null.

The second step is fine adjustment. It is the purpose of the fine adjustment to find the optimum time reference for frame sync in the event of group delay, since in that event there will not be a zero null. For simplicity, assume that all frequencies were transmitted at the same phase angle and 80 Hz apart. Group delay is a measure of the relative delay between frequencies and is calculated between any two frequencies by taking the change in phase divided by the difference in frequency, which is 80 Hz. The calculation is repeated for all frequencies, then the time reference for frame sync is adjusted and the calculations are repeated until the time reference in which the maximum group delay between any two frequencies is minimized.

An additional adjustment is necessary to correct for offset in long-haul telephone communication. In long-haul communication, the transmitted frequency is scaled up by multiplying it by a reference frequency to generate, for example, a microwave frequency for microwave transmission. At the receiving end, the signal is scaled down with the same reference frequency. However, the receiver reference frequency may not be phase-locked to the transmitter reference frequency and each component frequency of the data signal will have the same phase shift, or offset. The internal clock of the receiver is reset to adjust for the offset phase shift of sync, thereby automatically adjusting the receiver for the offset of all other frequencies.

Various configurations of shift registers, memory, sequence counter, multiplier accumulator, and processor unit may be employed according to the selected structure of the invention, in particular in connection with the Fast Fourier Transform (FFT) processor. Devices are available in LSI packages from for example Advanced Micro Devices of Sunnyvale, Calif. The object is to provide processed data at designated addresses through a data bus to a microprocessor unit in response to unprocessed data at designated addresses provided through the data bus 82. Shift registers 73 are employed as slave clocks to control the sequence of operations of the sequence counter 80, of the multiplier accumulator 64 and of the data address ROM 78 for the fast processor 58 and of the coefficient address ROM 79 which controls the coefficient ROM 81 for the multiplier accumulator 64.

The invention has now been explained with reference to specific embodiments. Still other embodiments may be employed in connection with the invention without departing from the spirit and scope thereof. It is therefore not intended that the invention be limited except as indicated by the appended claims.

I claim:

1. An apparatus for modulating a signal for transmission over a transmission path comprising:
   means for receiving a signal representing serialized bits of digital information;
   means coupled to said receiving means for dividing said digital information into segments of equal length;
   means coupled to said dividing means for partitioning said segments into first digital words of equal length, each first digital word having a modulating value;
   means coupled to said partitioning means for combining each of a plurality of said first digital words of said segment with a plurality of digital preset channel frequency values to produce a plurality of second digital words, each of said second digital words corresponding to one of said channel frequency values modulated by a plurality of said modulating values;
   means coupled to said combining means for processing all of said second digital words to construct a digital representation of an analog signal which is the amplitude sum over time of a plurality of sinusoidal signals at said preset channel frequencies which have been modulated by said combination of said modulating values; and
   means for converting said digital representation into an analog signal for transmission over said transmission path.

2. The apparatus according to claim 1 wherein said modulating value corresponds to an angle and a magnitude.

3. The apparatus according to claim 2 wherein said first digital words are mapped into a $\pi$ representation of angles evenly spaced over $2\pi$ radians.

4. The apparatus according to claim 2 wherein said combining means is operative to convert said first digital words into digital words representing the magnitude and the sine and the cosine of a vector giving a combined modulating value.

5. The apparatus according to claim 1 wherein said dividing means further includes means for introducing system control information in the form of first digital words included in each one of said segments.

6. The apparatus according to claim 1 wherein said processing means comprises means for processing said second digital words by an inverse discrete Fourier transform.

7. The apparatus according to claim 6 wherein said discrete Fourier transform processing means is a Fast Fourier transform processor.

8. The apparatus according to claim 1 incorporated into a telephone line modulator-demodulator, wherein said dividing means specifies at least twelve first digital words for information and further including means for introducing at least two first digital words for digital frame synchronization and error correcting.

9. The apparatus according to claim 8 wherein said preset channel frequencies are evenly spaced over a transmission bandwidth, each channel frequency corresponding to an ordered position of said first digital words in said segment.

10. The apparatus according to claim 1 wherein said combining means is operative to multiply a matrix of said first digital words by a shoring constant matrix to produce a matrix of third digital words which are combined with said digital channel frequency values.

11. The apparatus according to claim 10 wherein said shoring constant matrix is a left-shoring constant matrix consisting of all zeros except for a diagonal line of equal values of a constant extending from the first column of the first row to the last column of the last row and another diagonal line of equal values of the negative of said constant extending from the second column of the first row to the last column of the second-to-last row.

12. The apparatus of claim 10 wherein said shoring constant matrix is a right-shoring constant matrix consisting of all zeros except for a diagonal line of equal values of a constant extending from the first column of the first row to the last column of the last row and another diagonal line of equal values of the negative of said constant extending from the first column of the second row to the second-to-last column of the last row.

13. The apparatus of claim 10 wherein a first value for said shoring constant matrix is used for transmissions in a first direction over a two wire system over a first transmission bandwidth and a second value for said shoring constant matrix is used for transmissions in a second direction over a second transmission bandwidth.

14. An apparatus for modulating a signal for transmission over a transmission path comprising:
   means operative to receive a signal representing serialized bits of digital information for dividing said digital information into segments of equal length and introducing at least two digital word segments for digital frame synchronization and error correcting;
   means coupled to said dividing means for partitioning said segments into signals representing first digital words of equal length, each first digital word having a value corresponding to a phase and an amplitude;
   means coupled to said partitioning means for converting each one of said first digital words of said segment into a plurality of second digital words by multiplying a matrix of said first digital words by a shoring constant matrix to produce a matrix of said second digital words, such that a plurality of said second digital words are each formed from a plurality of said first digital words;
   means for combining each of said second digital words with a one of a plurality of digital representations of channel frequencies to produce third digital words;
   means coupled to said combining means for processing by a Fast Fourier transform all of said third digital words to construct a digital representation of an analog signal which is the superposition of a plurality of sinusoidal signals at said preset channel frequencies each having been modulated by said second digital words; and means for converting said digital representation into an analog signal for transmission over said transmission path.

15. A method for modulating a signal for transmission over a transmission path comprising:

dividing a signal representing serialized bits of digital information into segments of equal length;

partitioning said segments into first digital words of equal length, each first digital word having a modulating value;

combining each of said first digital words of said segment with a plurality of digital preset channel frequency values to produce a plurality of second digital words, each of said second digital words corresponding to one of said channel frequency values modulated by a plurality of said modulating values;

processing all of said second digital words to construct a digital representation of an analog signal which is the superposition of a plurality of sinusoidal signals at said preset channel frequencies each having been modulated by said combination of said modulating values; and converting said digital representation into an analog signal for transmission over said transmission path.

16. The method according to claim 15 wherein said modulating value corresponds to an angle and a magnitude.

17. The method according to claim 16 wherein said first digital words are mapped into a $\pi$ representation of angles evenly spaced over $2\pi$ radians.

18. The method according to claim 16 wherein said combining step comprises converting said first digital words into digital word signals representing the magnitude and the sine and the cosine of a vector giving a combined modulating value.

19. The method according to claim 15 wherein said dividing means further includes means for introducing system control information in the form of first digital words included in each one of said segments.

20. The method according to claim 15 wherein said processing step comprises processing said second digital words by an inverse discrete Fourier transform.

21. The method according to claim 20 wherein said discrete Fourier transform processing step is a Fast Fourier transform processing step.

22. The method according to claim 15 wherein said dividing step specifies at least twelve first digital words for information and further specifies at least two first digital words for digital frame tracking and error correcting.

23. The method according to claim 22 wherein said preset channel frequencies are evenly spaced over a transmission bandwidth, each channel frequency corresponding to an ordered position of said first digital words in said segment.

24. The method according to claim 15 further including the steps of:

generating a first parity code from a group of said first digital words, said first parity code becoming an additional first digital word;

receiving an analog signal representing said transmitted analog signal;

converting said received analog signal to third digital words corresponding to said second digital words;

converting said third digital words to fourth digital words corresponding to said first digital words;

generating a second parity code from a first group of said fourth digital words; and comparing said second parity code with one of said fourth digital words corresponding to said first parity code to determine whether a match exists between said first digital words and said fourth digital words indicating accurate transmission.

25. The method according to claim 24 further including the step of modifying individual ones of said fourth digital words in the event a parity match does not exist until a parity match exists.

26. A method according to claim 24 further including steps of:

framing received signals; and acquiring frame synchronization of said received signals, said acquiring step comprising determining the position of the null between frames by first approximating its position with a narrow band filter and then shifting relative timing of a frame until obtaining a minimum value of the maximum phase shift between any two channel frequencies.

27. An apparatus for demodulating a modulated signal, said modulated signal being an analog signal which can be represented by a plurality of sinusoidal signals at preset channel frequencies, each having relative phase and amplitude values during a frame period corresponding to a plurality of predefined digital bit values, said apparatus comprising:

means for converting said analog signal to a stream of digital bits;

means coupled to said converting means for framing said digital bit stream into frames;

means for processing said frames to produce first digital words, each first digital word representing a preset channel frequency modulated by a plurality of modulating values; and means for converting said first digital words into second digital words, each second digital word representing one of said modulating values.

28. The apparatus according to claim 27 wherein said processing means comprises means for processing a discrete Fourier transform.

29. The apparatus according to claim 27 further including means for detecting and correcting data value errors in said digital bit stream signals.

30. The apparatus according to claim 27 wherein said preset channel frequencies are frequencies which are evenly spaced over a transmission bandwidth, and wherein each channel frequency corresponds to an ordered position in a digital output.

31. The apparatus according to claim 27 wherein said converting means comprises means for multiplying said first digital words by a first constant matrix to yield such second digital words.

32. The apparatus of claim 31 wherein said first constant matrix comprises the transpose of a second constant matrix, multiplied by the inverse of the second constant matrix multiplied by the second constant matrix.

33. The apparatus according to claim 32 wherein said second constant matrix is a left-shoring constant matrix consisting of all zeros except for a diagonal line of equal values of a constant extending from the first column of the first row to the last column of the last row and another diagonal line of equal values of the negative of said constant extending from the second column of the first row to the last column of the second-to-last row.

34. The apparatus of claim 32 wherein said second constant matrix is a right-shoring constant matrix consisting of all zeros except for a diagonal line of equal values of a constant extending from the first column of the first row to the last column of the last row and another diagonal line of equal values of the negative of said constant extending from the first column of the second row to the second-to-last column of the last row.

35. The apparatus of claim 32 wherein a first value for said second constant matrix is used for transmissions in a first direction over a two wire system over a first transmission bandwidth and a second value for said second constant matrix is used for transmissions in a second direction over a second transmission bandwidth.

36. An apparatus for demodulating a modulated signal comprising:

means for converting an analog signal to a stream of digital bits;

means coupled to said converting means for framing said digital bit stream into frames;

means coupled to said framing means for processing by a Fast Fourier transform each frame of said digital bit stream to produce first digital words, each of said first digital words representing phase and amplitude components of a plurality of sinusoidal signals at preset channel frequencies;

means for multiplying said first digital words by a constant matrix to produce second digital words representative of predefined digital bit values to be recovered;

means coupled to said multiplying means for detecting and correcting data value errors in said digital bit stream by comparing the least significant bit of such first digital words to an error code word.

* * * * *